(12) United States Patent
Fathollahi et al.

(10) Patent No.: US 9,348,366 B2
(45) Date of Patent: May 24, 2016

(54) PROTECTIVE CASE WITH KEYBOARD FOR PORTABLE ELECTRONIC DEVICE

(71) Applicant: Incipio, LLC, Irvine, CA (US)

(72) Inventors: Andy Fathollahi, Corona Del Mar, CA (US); Tom Hee Kwon, Redondo Beach, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 14/587,543

(22) Filed: Dec. 31, 2014

(65) Prior Publication Data

US 2015/0192955 A1 Jul. 9, 2015

Related U.S. Application Data

(60) Provisional application No. 61/924,706, filed on Jan. 7, 2014.

(51) Int. Cl.
*G06F 1/16* (2006.01)

(52) U.S. Cl.
CPC ............ *G06F 1/1628* (2013.01); *G06F 1/1662* (2013.01)

(58) Field of Classification Search
CPC .............................. G06F 1/1628; G06F 1/1662
USPC ...................................... 361/679.08
See application file for complete search history.

(56) References Cited

U.S. PATENT DOCUMENTS

| 8,573,394 | B2 | 11/2013 | Ahee et al. |
| 8,960,421 | B1 | 2/2015 | Diebel |
| 9,047,061 | B2 | 6/2015 | Ahee et al. |
| 2012/0224316 | A1 | 9/2012 | Shulenberger |
| 2013/0016467 | A1 | 1/2013 | Ku |
| 2013/0050915 | A1* | 2/2013 | Tang ...................... G06F 1/1658 361/679.01 |
| 2013/0114198 | A1* | 5/2013 | Gengler ................ B65D 25/00 361/679.08 |
| 2013/0214661 | A1 | 8/2013 | McBroom |

(Continued)

OTHER PUBLICATIONS

Nick Guy, "Review: Incipio Steno Ultra-Thin Bluetooth Keyboard Folio for iPad Air," Jul. 14, 2014, http://www.ilounge.com/index.php/reviews/entry/incipio-steno-ultra-thin-bluetooth-keyboard-folio-for-ipad-air.

(Continued)

*Primary Examiner* — Anthony Q Edwards
(74) *Attorney, Agent, or Firm* — Manatt, Phelps & Phillips, LLP (57) ABSTRACT

A protective case for a tablet device having a back face and a front face, a touchscreen on its front face, and one or more control buttons and ports on its perimeter walls. The case comprises a shell having front and back sides wherein the front side is configured to receive and retain the tablet device while providing user access to the touchscreen and user access to one or more of the control buttons, said shell including a back wall that is configured to cover at least a portion of the back face of the tablet. The protective case further includes a front cover that includes a tray, a wireless keyboard and keyboard housing. The tray includes opposing side rails and the keyboard housing includes opposing grooves on opposing side walls that are concealed and configured to engage the rails to allow the keyboard housing to slide in and out from the tray in a defined manner. The tray, keyboard and shell may each include magnets to facilitate the positioning of the case in the various open and closed positions.

4 Claims, 12 Drawing Sheets

(56) References Cited

U.S. PATENT DOCUMENTS

| | | | |
|---|---|---|---|
| 2014/0071607 A1* | 3/2014 | Frinak | G06F 1/1624 361/679.09 |
| 2014/0071654 A1* | 3/2014 | Chien | H01H 13/704 362/23.03 |
| 2015/0138698 A1* | 5/2015 | Solland | F16B 2/22 361/679.01 |

OTHER PUBLICATIONS

Nick Guy, "Review: Targus Versavu Rotating Case & Stand for iPad (3rd-Gen)," Apr. 30, 2012, http://www.ilounge.com/index.php/reviews/entry/targus-versavu-rotating-case-stand-for-ipad-3rd-gen/.

Nick Guy, "Review: Targus Versavu Keyboard and Case for iPad 2," Aug. 3, 2011, http://www.ilounge.com/index.php/reviews/entry/targus-versavu-keyboard-and-case-for-ipad-2/.

* cited by examiner

PROTECTIVE CASE WITH KEYBOARD FOR PORTABLE ELECTRONIC DEVICE

INCORPORATION BY REFERENCE TO RELATED APPLICATIONS

This application claims benefit under 35 U.S.C. §119(e) from U.S. Provisional Application No. 61/924,706, filed on Jan. 7, 2014, the disclosure of which is incorporated herein by reference in its entirety.

BACKGROUND

1. Field of the Invention

This patent document relates to protective enclosures for portable electronic devices, and in particular to an implementation of a case having a wireless keyboard for tablet computing devices.

2. Description of the Related Art

Portable electronic tablet devices, such as the iPad® manufactured by Apple®, are typically larger than smartphones and smaller than laptop computers. (iPad and Apple are trademarks of Apple Inc.) Users typically interact with the tablet devices by touching the screen. It is not uncommon for users of tablets to interface with the tablet using a compatible wireless keyboard. There is an increasing preference for tablets over laptop computers during travel because tablets are generally lighter, smaller and easier to carry. However, as anyone who has traveled can attest, seating room on an airplane can be quite limited, both in terms of the user's posture options as well as in terms of the space available on the passenger's pull-out tray, which is often the only place to set down the tablet for use. Moreover, there are numerous hazards that surround the traveler, such as drinks and food, any of which can spill with even the slightest sudden movement or become lodged in or around the tablet and result in or lead to damage to the tablet. While protective cases for such tablets alone and in combination with wireless keyboards are known, such cases struggle with providing the desired ergonomics in such limited space conditions and in view of the accompanying travel hazards.

Therefore, a need exists in the art for tablet and keyboard covers that provide protection to the tablet and keyboard in both use and non-use conditions, while also capable of providing a reliable and user friendly adjustable mechanism that facilitates a suitable angle between the screen of the tablet and the keyboard.

SUMMARY

There exists a continuing need for new and improved designs for protective enclosures or cases for portable electronic devices, such as tablet computers, that provide protection and keyboard while also providing suitable and user friendly adjustability.

Various aspects are described in connection with the embodiments of the protective cases disclosed herein, including the drawings and claims, may be combined to form claims for a device, apparatus, system method of manufacture and/or use in any way, consistent with the teachings herein, without limitation.

BRIEF DESCRIPTION OF THE DRAWINGS

FIGS. 3A-3C are front views of the keyboard housing and keyboard in various positions relative to the tray.

DETAILED DESCRIPTION OF THE EMBODIMENTS

The features, aspects and advantages are described below with reference to the drawings, which are intended to illustrate but not to limit the invention. In the drawings, like reference characters denote corresponding features consistently throughout similar embodiments. FIGS. 1-10C illustrate various aspects of an embodiment of the protective case for Apple iPad tablet computer. It should be understood, however, that the various aspects and teachings therein embodied are not limited to any particular mobile device or case implementation.

FIGS. 1A-1F are front face, back face, left side, right side, top side, and bottom side views of the protective case 100, in the completely closed position. The case 100 is generally comprised of a shell component 200 and a front cover component 400.

The shell component 200 is in the form of a contoured panel that has a front side 210 and an opposing back side 220. The front side 210 is configured to receive and retain the tablet device (not shown) while allowing user to access the touchscreen on the front face of the tablet and to the controls buttons and ports on the perimeter walls of the device. The panel may be formed of a plastic shell that is configured to snap onto and retain the tablet securely within the cavity defined by the contoured walls of the panel.

The front cover component 400 is configured to cover the front face of the tablet when the case 100 is in the completely closed position. The front cover component 400 is in the form of a tray 404 that is connected via a flexible connection panel 300 that connects to the back side of the shell component 200 and forms a living joint 350 between the tray 404 and the shell 200. The tray 404 is configured to receive a keyboard 700 that is housed within a keyboard housing 500.

The keyboard housing 500 includes a bottom housing component 510 and a top housing components 520. The housing 500, and the embedded keyboard 700 therein, is configured to slide smoothly in and out of the tray 404 on tracks 410 that extend inwardly from perimeter walls 420 on opposing sides of the tray. The tracks 410 can engage into correspondingly dimensioned grooves 534 that are formed in the corresponding side walls 530 of the keyboard housing 500. The grooves 534 in the keyboard housing 500 are positioned within the perimeter 532 of the housing walls 530 underneath the top surface 710 of the keyboard 700 so as to limit external exposure from above.

FIGS. 2A-2F are front, back, left, right, top and bottom side views of the tray component 400 (disassembled from the shell 200 and the flexible connection panel 300) with the keyboard 700 and keyboard housing 500 fully received therein in the fully closed un-extended position.

The keyboard 700 can be a wireless keyboard capable of being wirelessly connected to the tablet device, via for example a Bluetooth low energy connection.

Figure 1A:
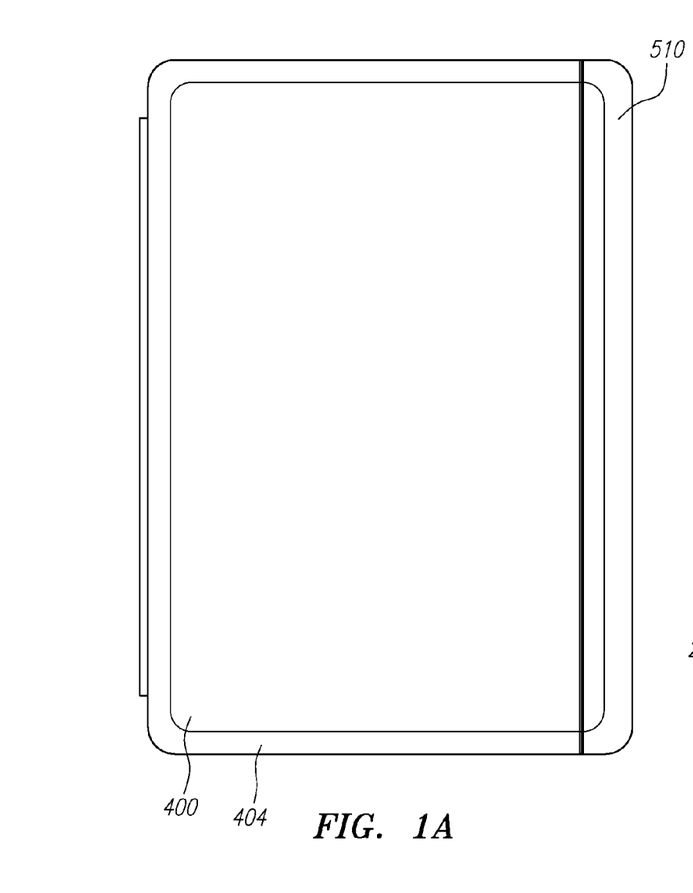
FIGS. 1A-1F are front face, back face, left side, right side, top side, and bottom side views of the protective case, in the completely closed position.
Figure 1B:
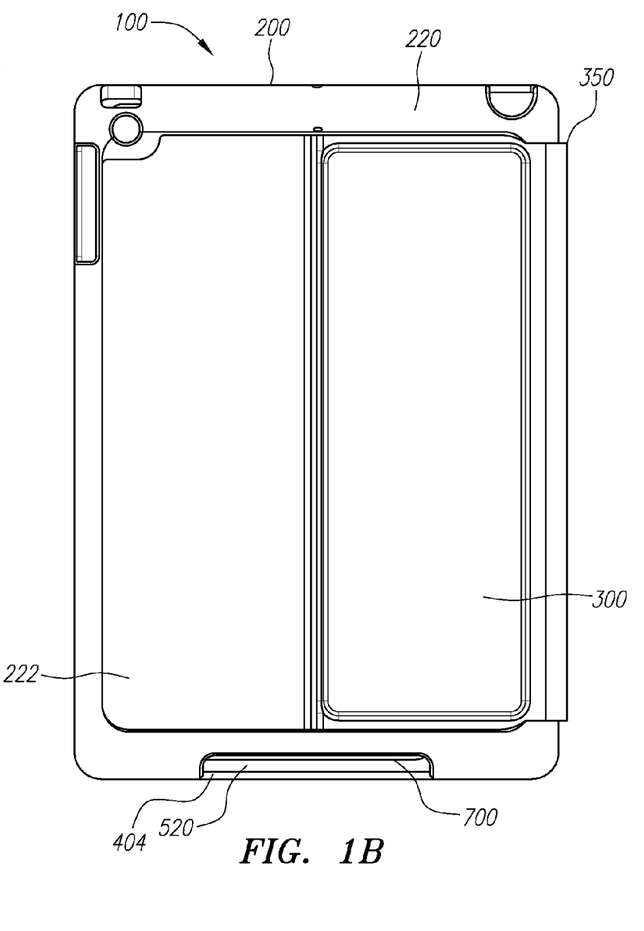
Figure 1C:
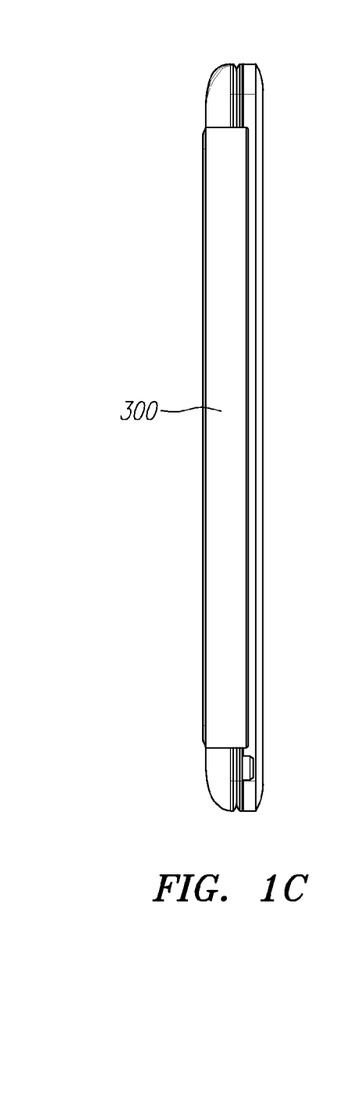
Figure 1D:
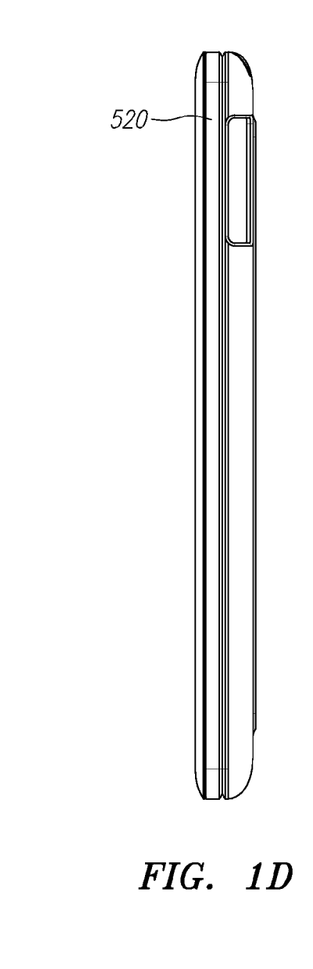
Figure 1E:
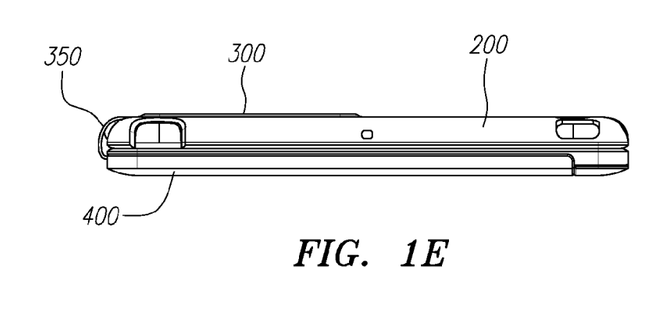
Figure 1F:
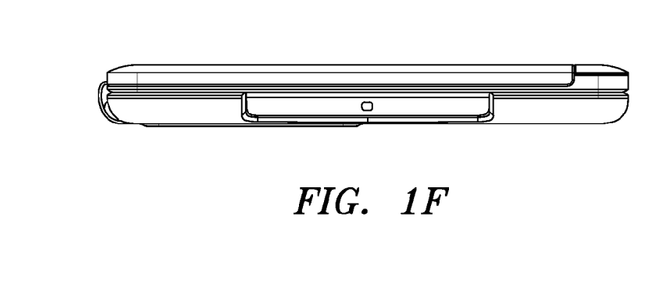
Figure 2A:
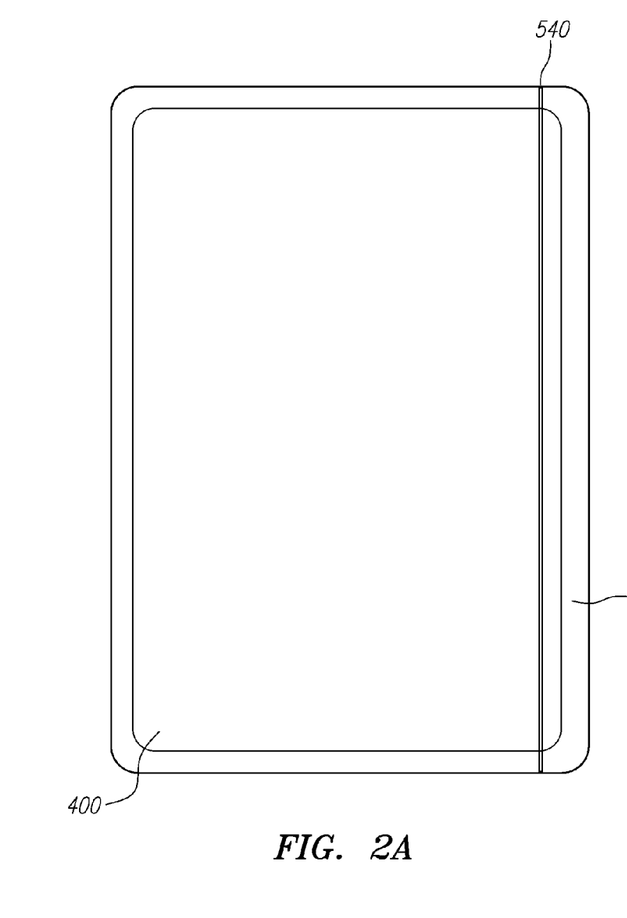
FIGS. 2A-2F are front, back, left, right, top and bottom side views of the tray component (disassembled from the shell and the flexible connection panel) with the keyboard and keyboard housing fully received therein in the full closed un-extended position.

When fully closed, the tray 404 and keyboard housing 500 mate on the front of the tray 404 along line 540 illustrated in FIG. 2A. Magnets 550 on the perimeter region of the keyboard housing 500 are positioned to align with magnets 250 having opposite polarity on the shell component 200 when the case 100 is in the fully closed position and thereby assist maintain the case in the closed position.

Figure 2B:
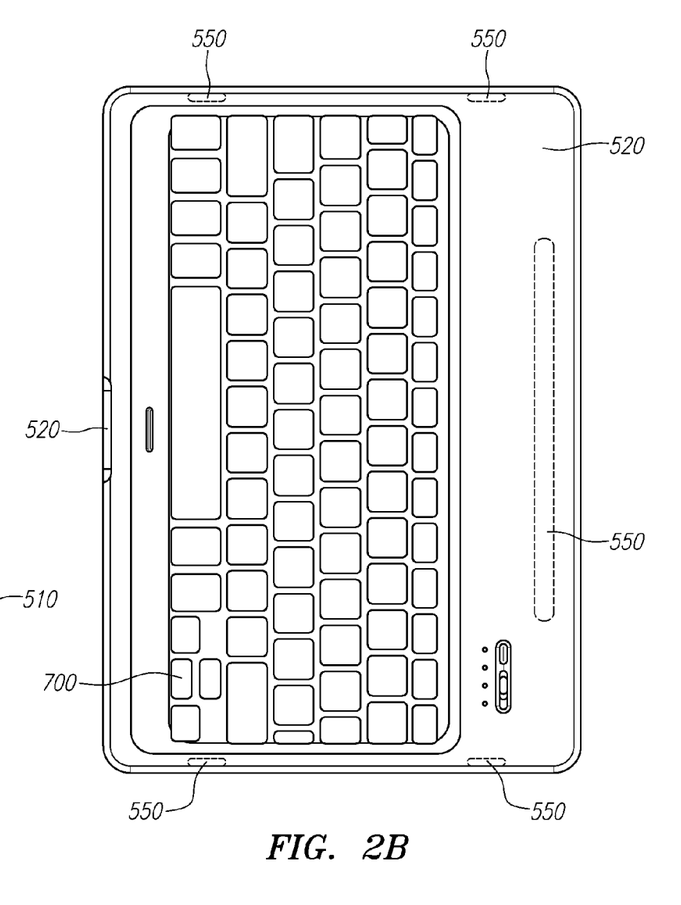
Figure 2C:
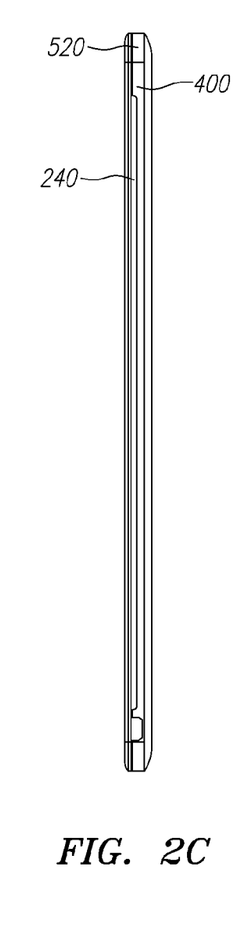
Figure 2D:
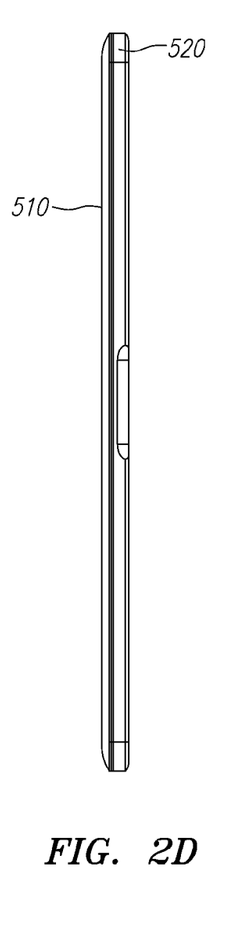
Figure 2E:
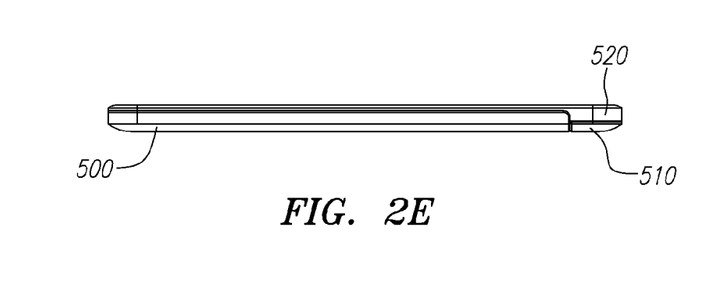
Figure 2F:
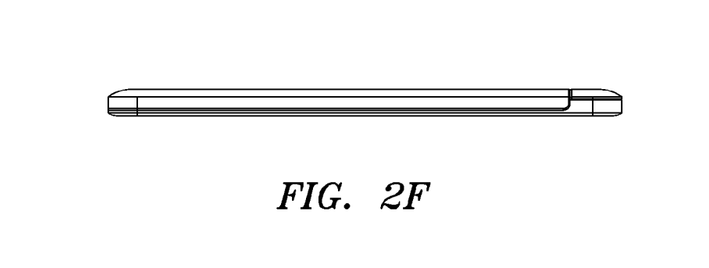

As illustrated in FIG. 2B the keyboard housing 500 may include magnets 550 (drawn in shadow) on opposing sides that facilitate positioning of the keyboard 700 in the desired location relative to the tray 404.

Figure 3A:
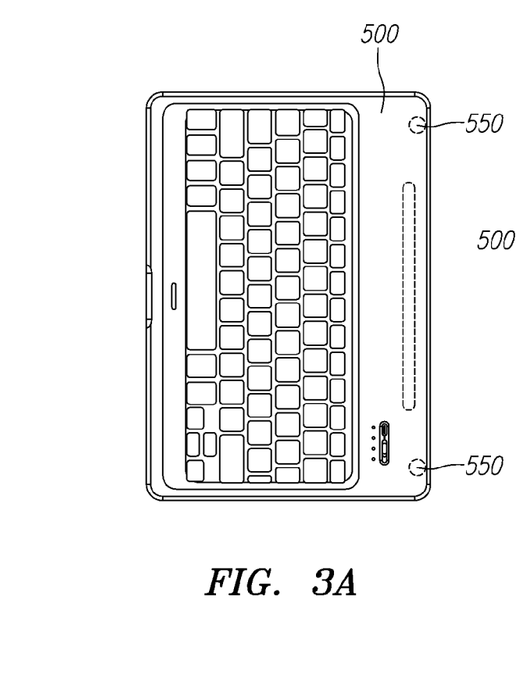
FIG. 3A illustrates the keyboard in the completely closed position.
Figure 3B:
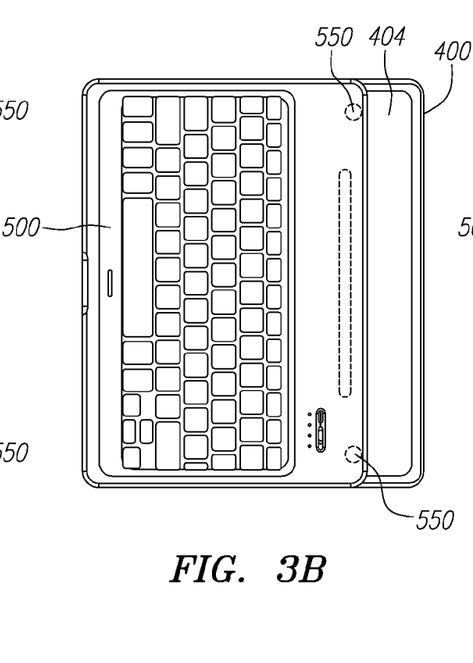
FIG. 3B illustrates the keyboard in a typing position and FIG. 3C illustrates the keyboard at its maximum travel or extended position. The circles at the two corners of the keyboard housing represent magnets on the keyboard housing.
Figure 3C:
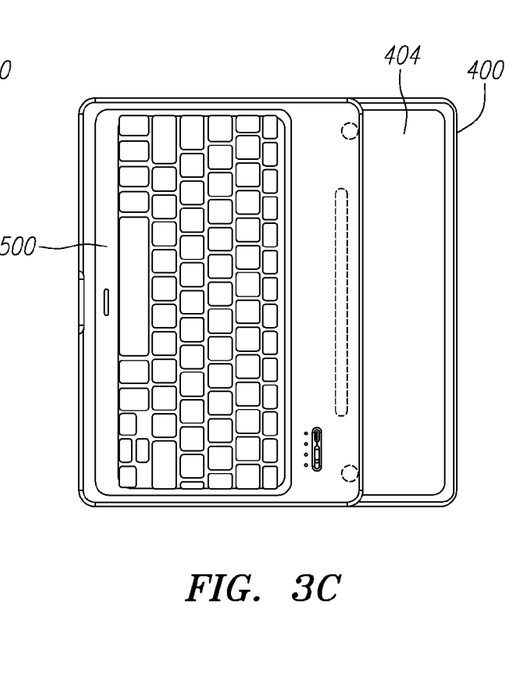

FIGS. 3A-3C are front views of the keyboard housing 500 and keyboard 700 in various positions relative to the tray 404. FIG. 3A illustrated the keyboard 700 in the completely closed position, FIG. 3B illustrated the keyboard 700 in a typing position and FIG. 3C illustrates the keyboard 700 at its maximum travel position. The circles at the two corners of the keyboard housing represent the magnets 550 on the keyboard housing 500.

Figure 4A:
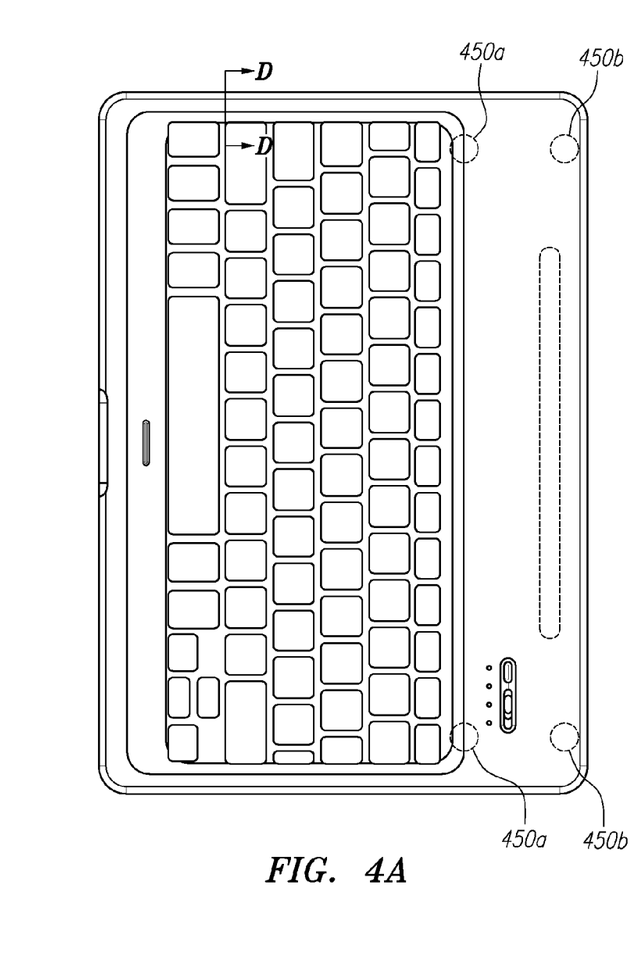
FIGS. 4A-4B are front and back views of the keyboard housing and tray of the protective case in the fully closed position.
Figure 4B:
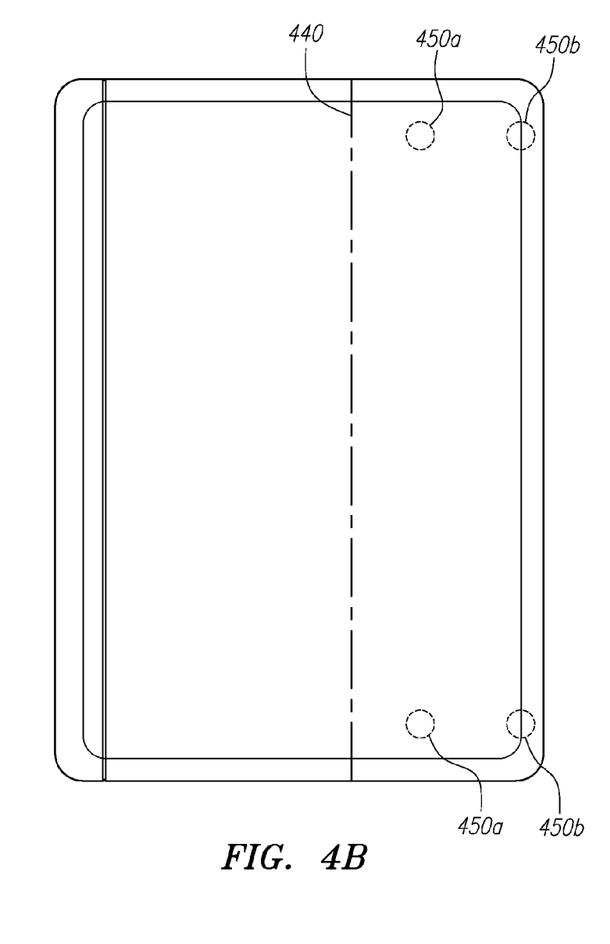

FIGS. 4A-4B are front and back views of the keyboard housing 500 and tray 404 of the protective case 100 in the fully closed position. The four circles drawn in shadow represent magnets 450a, 450b on the tray 404 and their relative positions that are employed to maintain in place the fully closed position and a typing position of the keyboard. When the keyboard 700 is in the closed position as shown in FIG. 3A, magnets 550 on the keyboard housing 500 align with magnets 450b on the tray 404 to help the keyboard 700 stay in the closed position. When the keyboard 700 is in the typing position as shown in FIG. 3B, magnets 550 on the keyboard housing 500 align with magnets 450a on the tray 404 to help the keyboard 700 stay in the typing position. The magnets 450 and 550 may be incorporate into the walls of the tray and housing components respectively or positioned on the outer surface or with respect to keyboard magnets 550 contained within a cavity of the keyboard housing 500.

A maximum travel line 440 is also noted on FIG. 4B to illustrate the distance the keyboard 700 and housing 500 is allowed to be pulled from the tray 404 before there is a "hard" stop. The hard stop may be implemented by way of a mechanical stop such as protrusion on either the housing 500 or the tray 404 or both that keeps the keyboard housing 500 from sliding completely out of the tray. It should be understood, however, that the keyboard housing 500 and tray 404 may or may not be configured to allow the keyboard housing to be completely removed by the user. Thus, for example, the stop may be adapted to provide increased resistance to moving the keyboard housing 500 out of the tray 404 beyond line 440, however the user may overcome this resistance with additional force thereby further extending the keyboard 700 from the tray and/or completely removing the keyboard housing from the tray.

Figure 5:
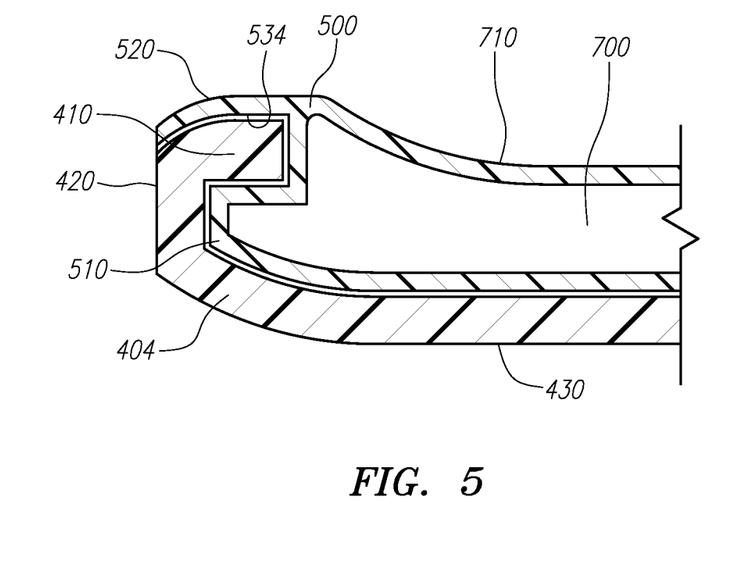
FIG. 5 is an illustration of a cross section of a portion of the housing taken along line D - - - D of FIG. 4A showing the top and bottom keyboard housing components in attached to the tray via the rail that extends longitudinally along the perimeter side walls of the tray above the bottom wall and groove that is formed in the keyboard housing which engages the tray rail.

FIG. 5 is an illustration of a cross section of a portion of the housing taken along line D - - - D of FIG. 4A showing the top and bottom keyboard housing components 520, 510 attached to the tray 404 via the rail 410 that extends longitudinally along the perimeter side walls 420 of the tray 404 above the bottom wall 430 and groove 534 that is formed within the perimeter of the keyboard housing 500 and positioned to engage the tray rail 410. The drawing is also illustrative of the interaction along the opposing side of the keyboard housing 500 and tray 404. Notably, the upper housing 520 of keyboard extends over the side walls 420 of the tray 404 to conceal the rails 410 there-below and protect the rails 410 and grooves 534 from debris that can cause failure or erratic or sudden movement of the keyboard from the tray when the user pushes the keyboard housing 500, and subsequently the keyboard 700, out of the tray 404 to position in a use or closed position.

Figure 6:
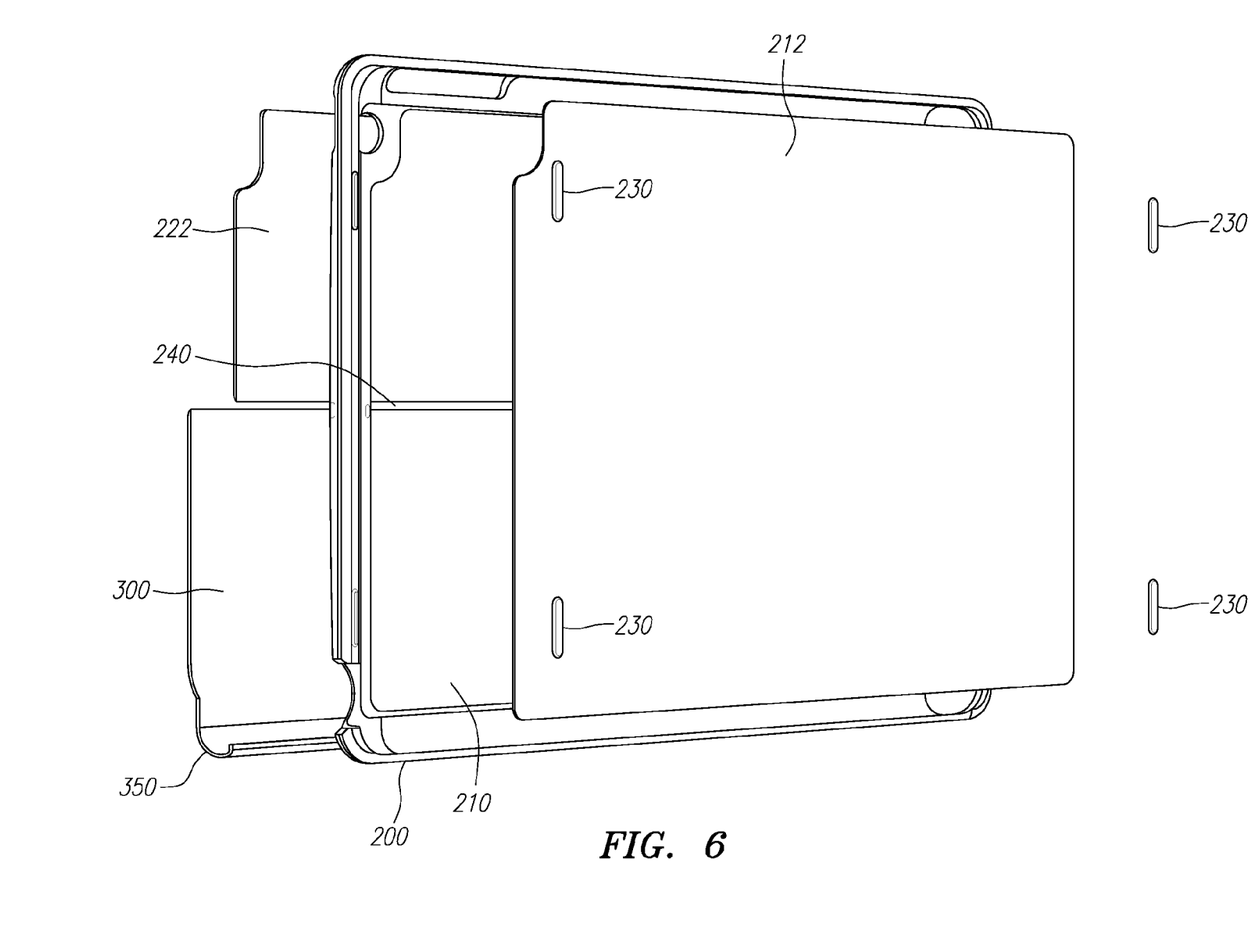
FIG. 6 is an exploded view of a partially disassembled shell component of the case, which is adapted to be removably attached (e.g., snapped on) to the tablet device, illustrating the various components of the case shell including a front liner that is configured to be attached to the front side of the shell.

FIG. 6 is an exploded view of a partially disassembled shell component 200 illustrating the various components of the case including a front liner 212 that is configured to be attached (mechanically via an adhesive or otherwise) to the front side 210 of the shell 200. Also illustrated are rubber feet 230 that are configured to be attached to the outer surface of the shell along the perimeter so that when the case is in the closed position the rubber feet are in contact with the outer surface of the top housing component 520 of the keyboard housing 500. Additionally shown is an aesthetic back cover 222 that can be mounted (via adhesive, mechanical means or the like) to the back side 220 of the shell 200 on an upper region.

The flexible connection panel 300 is also illustrated and is connected or attached (via adhesive and/or mechanical means or otherwise) to the shell 200 through a slot 240 extending from the back side 220 of the shell 200.

FIGS. 7A-7E are illustrations of various representative assembly steps of the shell component 200 and the attachment of the fabric liners 300 that cover the front and back sides 210, 220 of the shell 200 and the flexible panel 300 that connects the shell 200 to the tray 404.

Figure 7A:
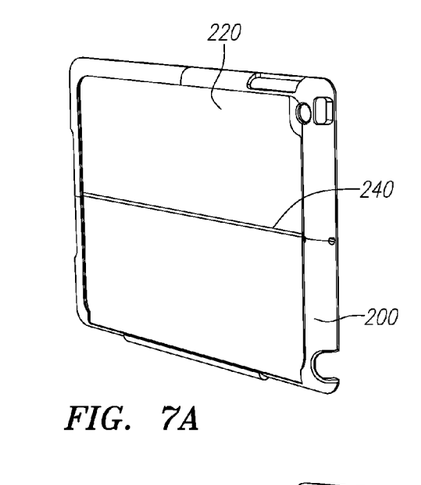
FIGS. 7A-7E are illustrations of various representative assembly steps of the shell component and the attachment of the fabric liners that cover the front and back side of the shell and the flexible panel that connects the shell to the tray.

As shown in FIG. 7A, the slot 240 is configured to feed extending portions of the aesthetic back cover 222 and flexible connection panel 300.

Figure 7B:
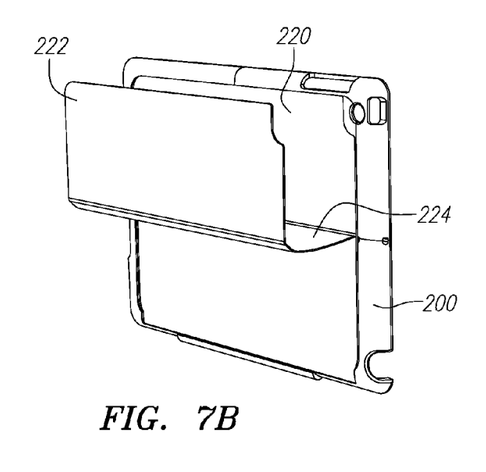

As shown in FIG. 7B, the extending portion 224 of the aesthetic back cover 222 is fed through the slot 240 from the back side 220 to the front side 210.

Figure 7C:
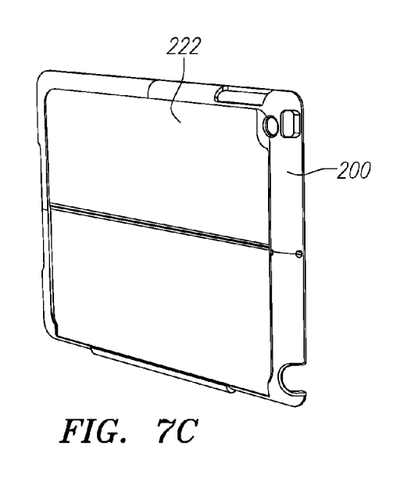

After the extending portion 224 is completely fed into the slot 240 as shown in FIG. 7C, the aesthetic back cover 222 can be attached to the back side 220, for example, by gluing. The extending portion 224 can be attached to the front side 210.

Figure 7D:
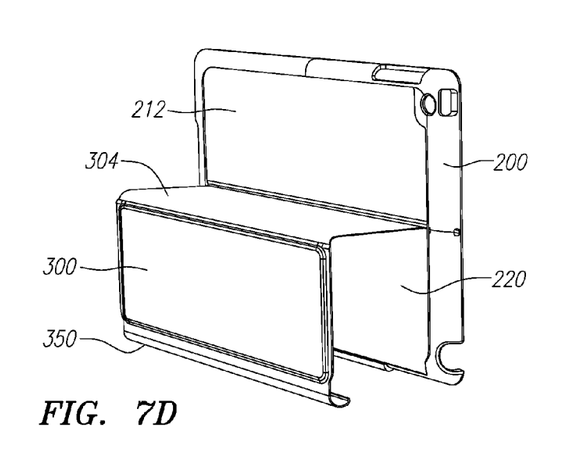

As shown in FIG. 7D, the extending portion 304 of the flexible connection panel 300 is fed through the slot 240 from the back side 220 to the front side 210.

Figure 7E:
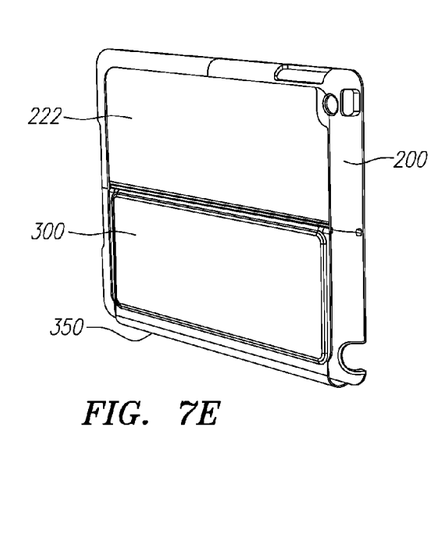

After the extending portion 304 is completely fed into the slot 240 as shown in FIG. 7E, the extending portion 304 can be attached to the front side 210. The front liner 212 can then applied to cover both the extending portions 224, 304.

Figure 8A:
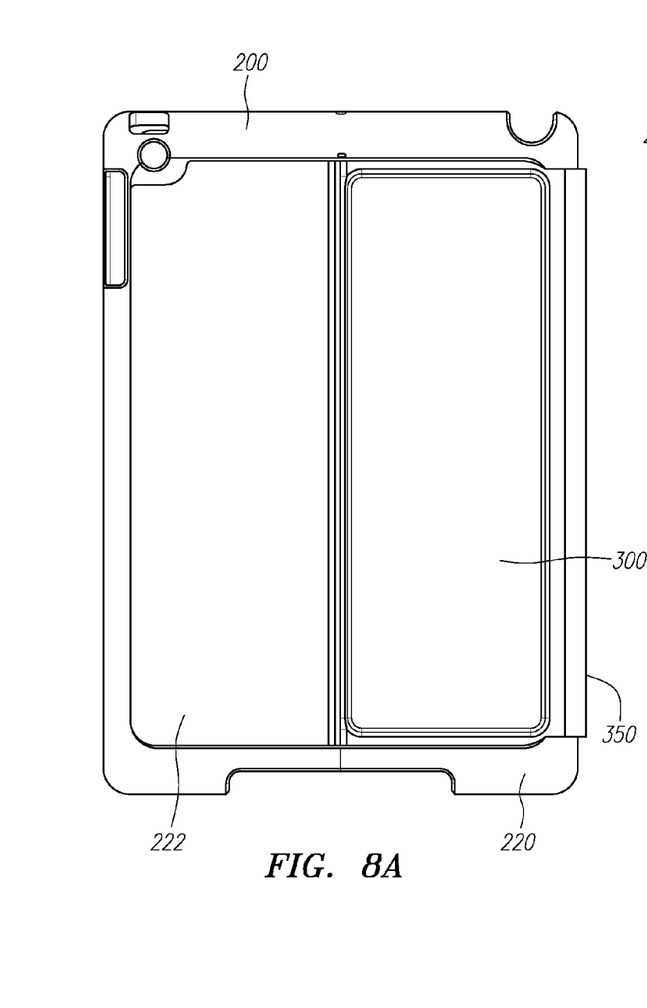
FIGS. 8A-8B further illustrate the construction of the shell component including flexible connection panel that connects the shell to the tray, which may be formed of any suitable material including pressed micro suede fabric.
Figure 8B:
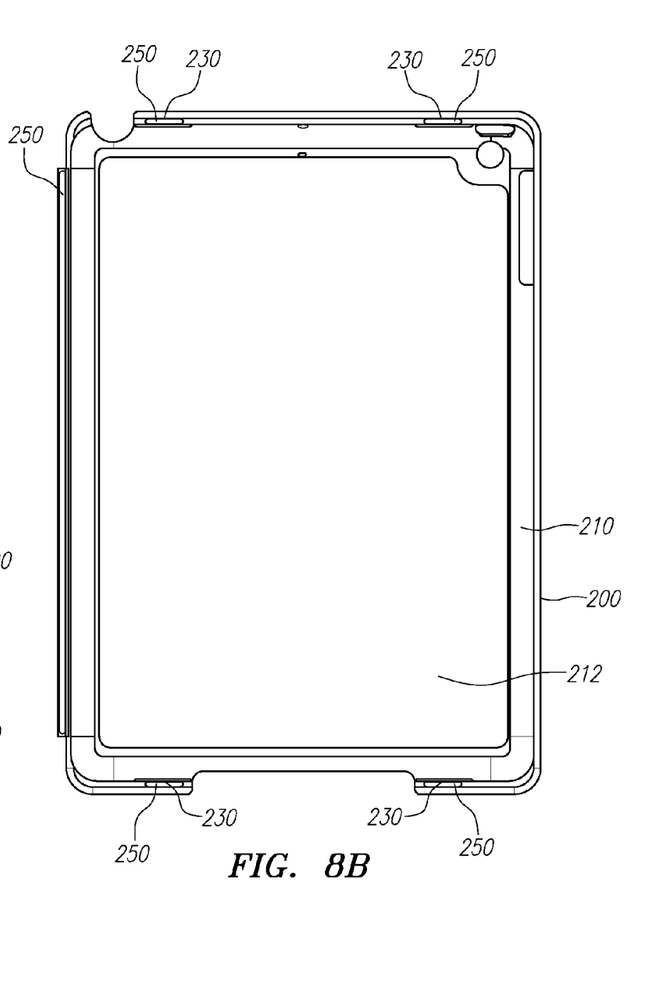

FIGS. 8A-8B further illustrate the construction of the shell component 200 and including flexible connection panel 300 that connects the shell 200 to the tray 404. The flexible connection panel 300 may be formed of any suitable material including heat pressed micro suede fabric. The fabric liner 212 mounted to the front side 210 of the shell is also illustrated.

As illustrated, the shell 200 may further include one or more magnets 250 position on the side of the shell 200 configured to engage the opposing surface of the keyboard housing 500 of the front cover 400. The magnets 250 are configured to engage the corresponding magnets 550 on the keyboard and/or tray such as those depicted in FIGS. 3A-3B and FIGS. 4A-4B. The shell magnets 250 are capable of providing additional stability to the shell 200 when the case 100 is open and in a use position such that one side of the shell 200 is in contact with the outer surface of the keyboard housing 400 or tray 404. Magnets can be added at the contact surface between the shell and the keyboard when in a use position such as depicted in FIG. 10C such that the additional magnets on the shell 200 are positioned to correspond with magnets 550 on the housing depicted and referenced in FIG. 2B and/or FIGS. 3A-3C.

Figure 9A:
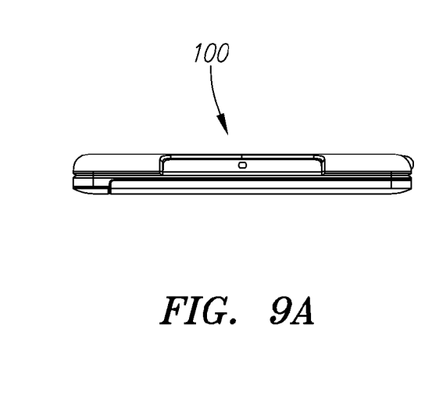
FIGS. 9A-9C are side illustrations of the protective case in a fully closed position, in a ninety degree open position with the keyboard fully inserted in the tray, and in an even more open position with the keyboard partially removed or extend out from the tray.
Figure 9B:
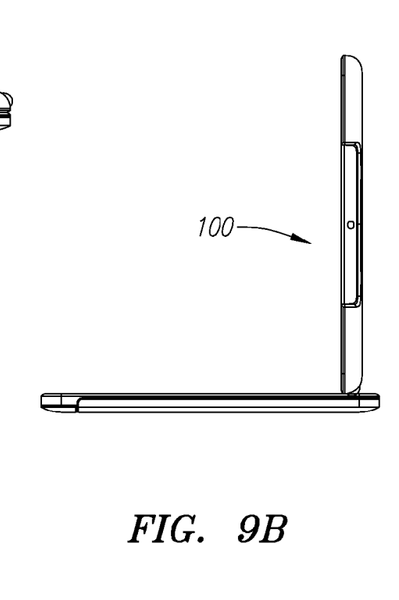
Figure 9C:
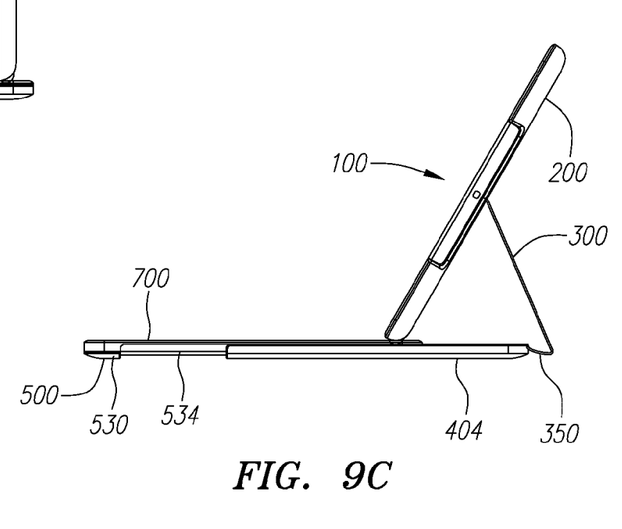

FIGS. 9A-9C are side illustrations of the protective case 100 in a fully closed position, in a ninety degree (90°) open position with the keyboard 700 and keyboard housing 500 fully inserted in the tray 404, and in an even more open position with the keyboard 700 and keyboard housing 500 partially removed or extended outward from the tray 404.

Figure 10A:
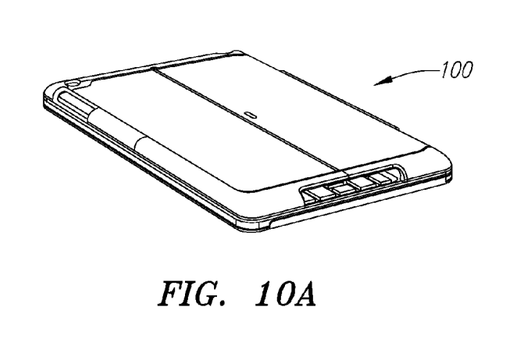
FIGS. 10A-10C are front perspective views of the corresponding illustrations set forth in FIGS. 9A-9C.
Figure 10B:
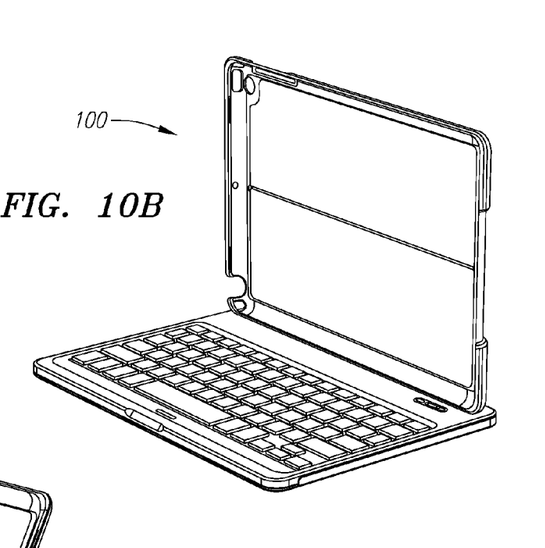
Figure 10C:
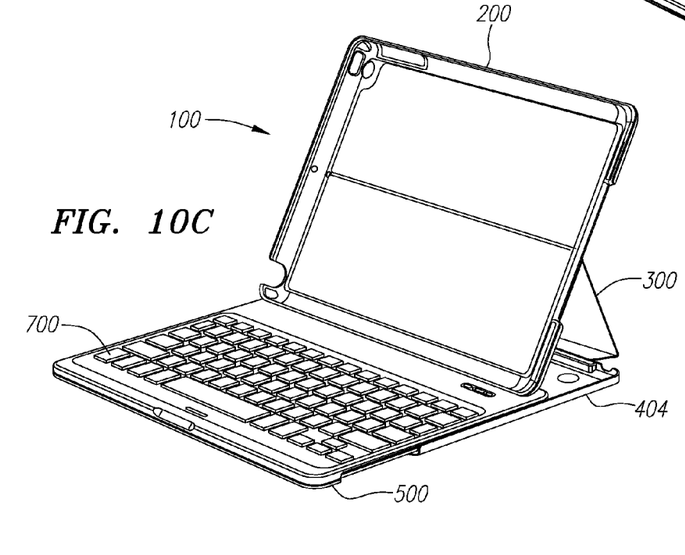

FIGS. 10A-10C are front perspective views of the corresponding illustrations set forth in FIGS. 9A-9C. As depicted in those drawings, one side of the shell component is contact adapted to be in contact with the outer surface of the keyboard housing 500 when the case is being used in keyboard mode.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case configured to removably receive and retain a tablet device, said tablet device having a back face and a front face, a touchscreen on its front face, and one or more control buttons and ports on its perimeter walls, the case comprising:
   a shell having front and back sides, wherein the front side is configured to receive and retain the tablet device while providing user access to the touchscreen and user access to one or more of the control buttons;
   a front cover having a front region and a back region, the front region being configured to cover the front face of the tablet device when the case is in a fully closed position and the back region being configured to cover the back side of the shell when the case is in a fully open position;
   the front region of the cover further including a tray, a wireless keyboard and a keyboard housing, wherein the tray includes opposing side rails and the keyboard housing includes an upper housing have an upper outer surface and opposing grooves located on opposing side walls of the keyboard housing underneath said upper surface, said grooves being configured to engage with the rails and allow the keyboard housing to slide in and out from the tray in a defined manner;
   wherein the tray, keyboard housing and shell each include magnets that magnetically attract to one another to assist in maintaining the positioning of the shell in an open position relative to the tray and keyboard housing and wherein the opposing grooves are not visible when viewed perpendicular to the upper surface of the keyboard housing.

2. The protective case of claim 1, wherein the upper housing of the keyboard housing extends over the side walls of the tray to conceal the rails there-below.

3. A protective case for a tablet device, the case comprising:
   a shell having a front side and a back side, said front side defining a cavity that is configured to receive and retain the tablet device;
   a front cover having a tray, the tray is connected via a flexible connection panel to the back side of the shell, wherein the tray includes opposing side rails, wherein the front cover further includes a keyboard housing for housing a wireless keyboard therein, the keyboard housing includes opposing grooves located on opposing side walls of the housing, the grooves are configured to engage with the rails and allow the keyboard housing to slide in and out from the tray in a defined manner;
   wherein the tray, keyboard housing and shell each include magnets that magnetically attract to one another to assist in maintaining the positioning of the shell in multiple open positions relative to the tray and keyboard housing and in the fully closed position.

4. The protective case of claim 3 further comprising a flexible connective member that connects the shell to the tray, said connective member including a portion that extends through a slot in the shell from the back side of the shell to the front side of the shell and is attached to the front side of the shell.

* * * * *